(12) United States Patent
Chatigny

(10) Patent No.: US 8,718,430 B2
(45) Date of Patent: May 6, 2014

(54) DOUBLE CLAD OPTICAL FIBER WITH SEALED STRIPPED PORTION

(75) Inventor: Stéphane Chatigny, Saint-Redempteur (CA)

(73) Assignee: Coractive High-Tech Inc., Quebec (Quebec) (CA)

( * ) Notice: Subject to any disclaimer, the term of this patent is extended or adjusted under 35 U.S.C. 154(b) by 163 days.

(21) Appl. No.: 13/521,665

(22) PCT Filed: Jan. 14, 2011

(86) PCT No.: PCT/CA2011/050015
§ 371 (c)(1),
(2), (4) Date: Jul. 11, 2012

(87) PCT Pub. No.: WO2011/085496
PCT Pub. Date: Jul. 21, 2011

(65) Prior Publication Data
US 2012/0321264 A1 Dec. 20, 2012

Related U.S. Application Data

(60) Provisional application No. 61/295,353, filed on Jan. 15, 2010.

(51) Int. Cl.
G02B 6/036 (2006.01)
B05D 7/00 (2006.01)

(52) U.S. Cl.
USPC .................................. 385/126; 427/163.2

(58) Field of Classification Search
USPC ............ 385/132–127, 146; 65/390, 397, 402, 65/403; 427/163.2
See application file for complete search history.

(56) References Cited

U.S. PATENT DOCUMENTS

| | | | |
|---|---|---|---|
| 4,678,273 A * | 7/1987 | Vilhelmsson ................ 385/128 |
| 6,687,445 B2 * | 2/2004 | Carter et al. ................ 385/127 |
| 7,003,206 B2 * | 2/2006 | Tankala et al. .............. 385/127 |
| 7,110,647 B2 * | 9/2006 | Farroni et al. ............... 385/123 |
| 7,306,376 B2 * | 12/2007 | Scerbak et al. ............... 385/76 |
| 7,373,070 B2 | 5/2008 | Wetter et al. | |
| 8,001,806 B2 * | 8/2011 | Huang et al. .................. 65/384 |
| 2009/0238215 A1 | 9/2009 | Varming | |

* cited by examiner

Primary Examiner — Akm Enayet Ullah
(74) Attorney, Agent, or Firm — Finch & Maloney PLLC

(57) ABSTRACT

A double clad optical fiber having a portion extending along its length along which an outer waveguide cladding and a protective jacket are absent and having faces of the second waveguide cladding at two lengthwisely opposite ends, wherein a water impervious sealant is applied to impede lengthwise diffusion of water through the faces of the second waveguide cladding.

22 Claims, 7 Drawing Sheets

DOUBLE CLAD OPTICAL FIBER WITH SEALED STRIPPED PORTION

CROSS-REFERENCE TO RELATED APPLICATIONS

The present application is a National Stage Filing Under 35 U.S.C. 371 of International Application Serial No. PCT/CA2011/050015, titled DOUBLE CLAD OPTICAL FIBER WITH SEALED STRIPPED PORTION, filed Jan. 14, 2011, which claims benefit of U.S. Provisional Application Ser. No. 61/295,353, titled ENVIRONMENTALLY ROBUST OPTICAL FIBER PROTECTION ASSEMBLY, filed on Jan. 15, 2010. The entireties of each of the above-referenced patent applications are incorporated herein by reference.

BACKGROUND

FIG. 1 shows an example of a double clad optical fiber 11. The double clad optical fiber 11 generally includes a waveguide core 10 having a core refractive index 12, an inner waveguide cladding 14 around the core having an inner cladding refractive index 16, and an outer waveguide cladding 18 around the inner cladding 14 and having an outer cladding refractive index 20, and a jacket 22 around the outer waveguide cladding 18, having a jacket refractive index 24, typically higher than the outer cladding refractive index 20.

In the delivery of high power optical signals and in the making of high power fiber lasers and amplifiers, the core 10 can be of doped silica, the inner cladding 14 can have one or more layers of silica glass or doped silica glass, and the outer cladding 18 of non silica material can have an significantly lower refractive index 20 that prevents light from escaping the core 10 and the inner cladding 14. The outer cladding 18 can be made of a low index polymer such as silicone, fluorinated ethylenic-cyclo oxyaliphatic substituted ethylenic copolymer, or another material, but it is common to use fluoroacrylate optical fibers which are characterized by the fact that the material of the second waveguide cladding 18 is a fluoroacrylate, such as product number PC363, PC373, PC375, or PC409 manufactured by SSCP CO. or product DeSolite® DF0007 manufactured by DSM Desotech. In certain cases, the core 10 and the inner cladding 14 are of the same material and therefore can have the same refractive index. To provide a complete example, the protective jacket can be made of a high index acrylate, for instance such as DSM Desotech's product number DS-2015, product number 3471-2-136 or SSCP CO.'s product number UVF-HTS-001. The main function of the jacket is to improve the mechanical performance of the fiber.

SUMMARY

In some cases, double cladding optical fibers have the outer cladding and the jacket removed along a portion thereof, which can be referred to as a stripped portion 26, such as shown in FIG. 2, which leaves two faces 28, 30 of the outer cladding at corresponding ends of the stripped portion 26. This occurs at splice points and a stripped window points, for instance. In some cases, the portion is left bare such as shown in FIG. 2. In other cases, the portion can be recoated, with the recoating material 31, prior to use as shown in FIG. 3, such as to provide better mechanical resistance for instance. It is common to do the recoating with a same material than the outer cladding.

We have observed that some fluoroacrylate double clad optical fibers having the outer cladding and the jacket removed along one or more portions thereof, with or without recoating presented high amounts of optical attenuation. This problem was investigated in a scientific manner, and subsequent experiments led to the hypothesis that the attenuation could be caused by exposure of the fluoroacrylate of the outer cladding to water. To confirm that hypothesis we have exposed a stripped double clad optical fiber for 429 hours in a 85° C. and 85% relative humidity environment. FIG. 4 shows the induced optical loss.

Analyzing the problem led to understand that water can penetrate into the fluoroacrylate by two main ways, that is radial diffusion 34, in a direction transverse to the length of the fiber, and longitudinal diffusion 32 in a direction parallel to the length of the fiber. This is schematized in FIG. 5. It appeared that the jacket, which is typically of a water-impervious material creates a significant water barrier effect which significantly protects the fluoroacrylate from premature degradation. However, when the optic fiber is left bare, faces of the outer cladding, at opposite ends of the portion, are exposed to water and thus to longitudinal diffusion thereof into the outer cladding layer. Further, it appears that even in cases where the stripped portion is recoated with fluoroacrylate, such as in FIG. 3, the water could first penetrate into the fluoroacrylate recoating 31 by radial diffusion, and then migrate from the fluoroacrylate recoating into the outer cladding by longitudinal diffusion. In this case, the fluoroacylate recoating 31 and the outer cladding will be degraded by water exposure.

It was found that the intrusion of water into the outer cladding can be significantly impeded by applying a sealant in a manner to block access of the water to the two faces of the outer cladding at the ends of the stripped portion, which significantly reduces the amount of attenuation when the optic fiber is used in an environment where it is exposed to significant amounts of water.

Henceforth, in accordance with one aspect, there is provided: a double clad optical fiber having a waveguide core, an inner waveguide cladding around the core having an inner cladding refractive index, and an outer waveguide cladding around the inner cladding having an outer cladding refractive index lower than the inner cladding refractive index, and a jacket around the second waveguide cladding having a jacket refractive index, the optical fiber having a portion extending along its length along which the second waveguide cladding and the jacket are absent, the portion having corresponding faces of the second waveguide cladding at two lengthwisely opposite ends, and having a sealant at said portion, the sealant impeding lengthwise diffusion of environmental water through the faces of the second waveguide cladding.

In accordance with another aspect, there is provided: a method of protecting a double clad optical fiber having a waveguide core, an inner waveguide cladding around the core, and an outer waveguide cladding around the inner cladding made of a fluoroacrylate, and a jacket around the second waveguide cladding, the optical fiber having a portion extending along its length along which the second waveguide cladding and the protective jacket are absent, the portion having corresponding faces of the second waveguide cladding at two lengthwisely opposite ends, the method comprising: applying a sealant at said portion in a manner to prevent water from affecting the faces of the second waveguide cladding.

In accordance with another aspect, there is provided: an environmentally robust optic fiber package for an exposed optical fiber, said exposed optical fiber having a core region having a core refractive index, said core region being made of doped silica; an inner cladding region, said inner cladding region being made of one of silica or doped silica, an outer cladding region layer having an outer cladding refractive index, said outer cladding region layer being made of a low refractive index non silica material, and a protective jacket layer; said outer cladding region layer having an exposed portion for which said protective jacket layer is absent, said exposed portion permitting access to said outer cladding region layer by a contaminant; said package comprising: a cap covering at least said exposed portion by a sealing layer having a sealant refractive index, said sealant refractive index being one of lower than and equal to said outer cladding refractive index, said sealing layer having barrier properties preventing said contaminant to reach said cladding region layer.

In this specification, the expression water refers to $H_2O$ in liquid and gaseous form.

DESCRIPTION OF THE DRAWINGS

In the figures.

It will be noted that throughout the appended drawings, like features are identified by like reference numerals.

DETAILED DESCRIPTION

Figure 1A:
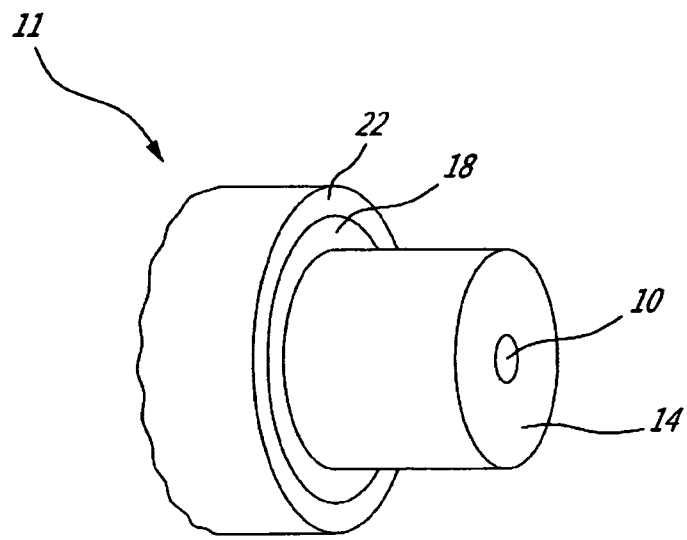
FIG. 1A (PRIOR ART) shows an example of a double cladding optical fiber.
Figure 1B:
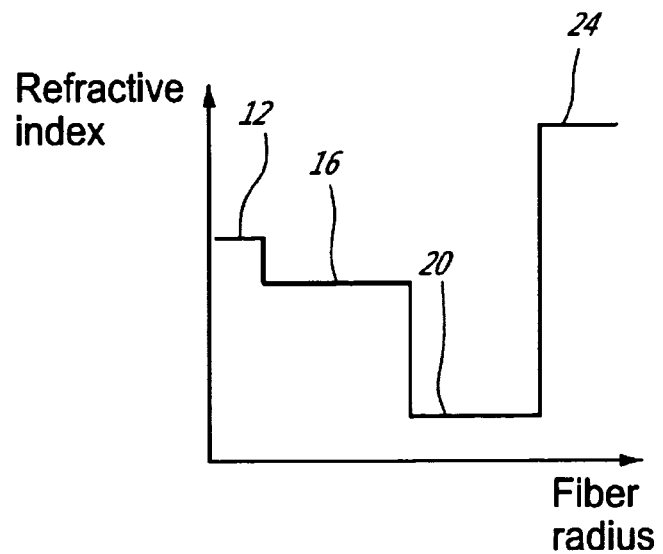
FIG. 1B (PRIOR ART) shows a typical refractive index profile of a double cladding optical fiber.
Figure 2:
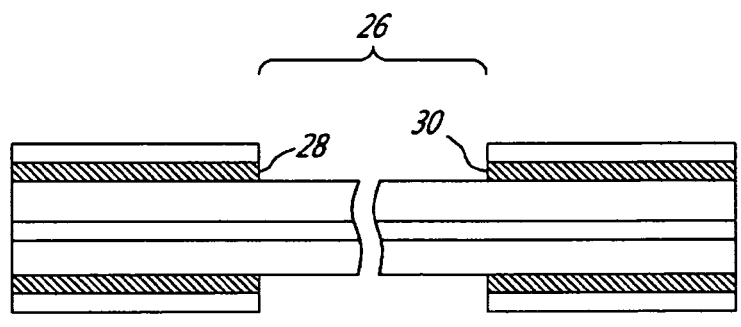
FIG. 2 shows an example of an double cladding optical fiber having a stripped portion.
Figure 3:
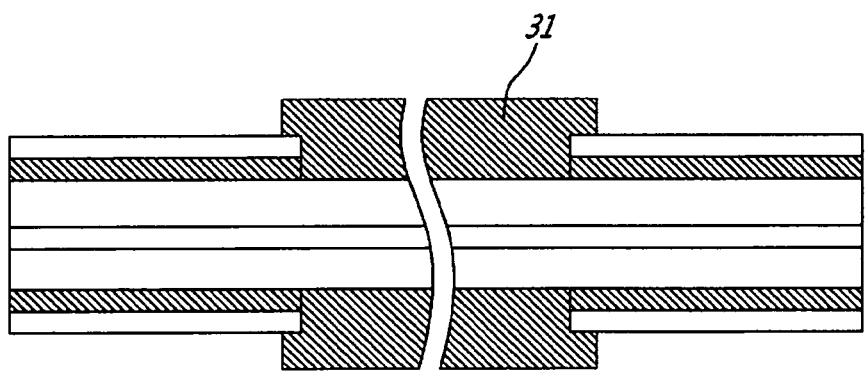
FIG. 3 shows an example of a double cladding optical fiber having a stripped portion with a recoat.

A stripped portion such as shown in FIG. 2 occurs for instance at splice points. To splice two fibers, the fibers are first stripped, which can be done mechanically, thermally or chemically. A mechanical stripping can be done with, for example, a microstrip fiber stripper to remove the protective jacket 22 and the outer cladding 18. Thermal stripping is similar to mechanical stripping with the exception that the stripping blades are heated or that the coating is heated in an oven. Chemical stripping is done by dipping the fiber into a chemical agent such as methylene chloride or acetone. Other methods of stripping such as laser and hot air could be employed as well. After the stripping is completed, the two portions of exposed glass are then cleaned, with isopropanol for example, to remove contaminant such as dust or coating/cladding residue. The glass ends of the two fibers are cleaved using a fiber cleaver, such as the York FK11. Afterwards, the fibers are spliced together using a standard fusion splicer such as the Fujikura FSM-45F. Other applications have a stripped portion even in cases where there is no splicing, such as window strip applications. In window strip applications, the fibers do not need to be cleaved and spliced; a window is simply stripped over a portion of the fiber. In applications such as power combiners, for instance, the stripped portion is typically left bare.

However, in other applications, it can be preferred to recoat the stripped portion such as to achieve better mechanical resistance. The exposed glass surface can be recoated with a UV curable fluoroacrylate using a fiber recoater such as the Vytran PTR-200, for instance.

As detailed above, the optical performance of the fluoroacrylate layer can be affected by exposition to water. This can be caused by phenomena such as delamination or crystallization. In unstripped portions of the fiber, the protective jacket can be considered to play an important environmental role in providing a barrier that slows down the penetration of water and reduces the degradation of the fluoroacrylate layer.

Figure 4:
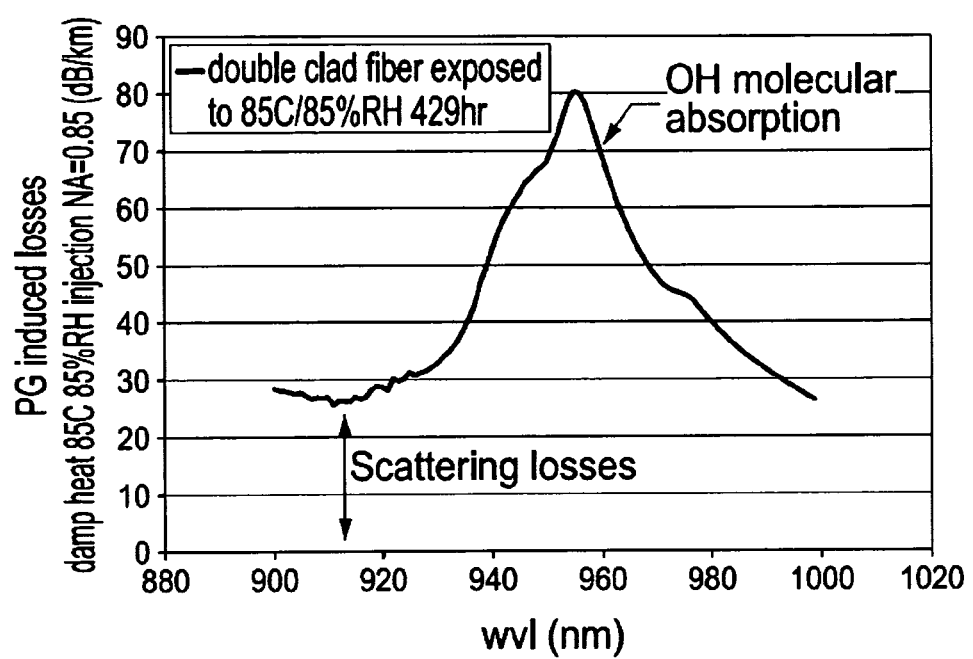
FIG. 4 is a graph showing optical attenuation of a fluoroacrylate coated optical fiber following exposure of the fluoroacrylate to water.

The degradation is depicted in FIG. 4, which shows the optical attenuation induced in a typical fluoroacrylate optical fiber when exposed to water. The results are shown in the typical pumping wavelength band of Yb, YbEr and Er fiber lasers. Two major degradation components are visible in FIG. 4, first there is a peak at 955 nm, likely stemming from the molecular absorption of $OH^-$ that diffuses through the fluoroacrylate layer, and there is also a scattering component that likely results from the delamination or the crystallization of the fluoroacrylate layer.

Figure 5:
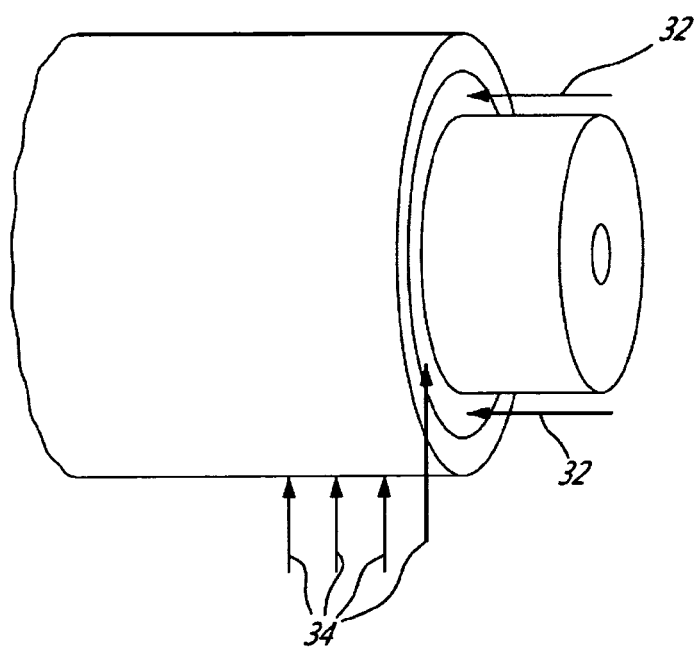
FIG. 5 schematizes water penetration into the outer cladding.

FIG. 5 shows the two main water penetration mechanisms in the fluoroacrylate layer. The first one is the radial diffusion 34 of water trough the protective jacket which allows water to reach the outer cladding. This mechanism can be quite slow, perhaps negligible, if the protective jacket is in good condition. The second mechanism is the longitudinal penetration 32 by direct exposition of the outer cladding surface to water. This later type of penetration mechanism can occur at a splice point, a stripped window point, at a recoated portion recoated by a fluoroacrylate or at a position where protective jacket is removed, to name a few examples. Water can then attack outer cladding directly via a chemical reaction but can also penetrate by capillarity and cause delamination of the outer cladding.

Figure 6:
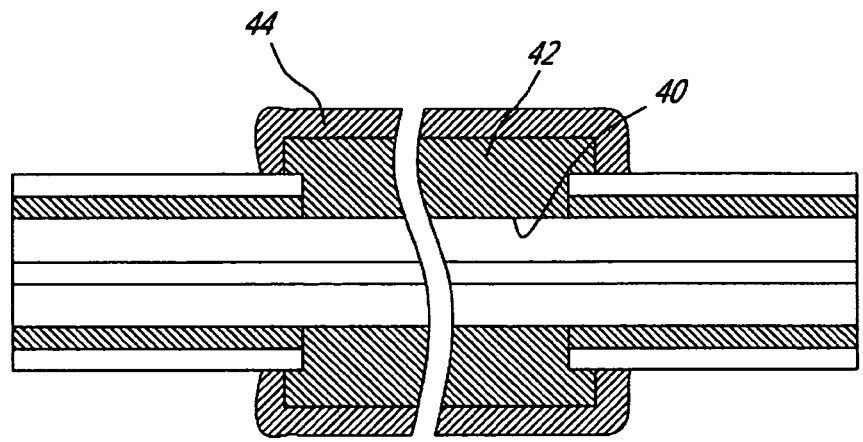
FIG. 6 shows a first example of an optical fiber with a sealant, where the sealant is applied onto a recoat.

FIG. 6 shows a first exemplary embodiment. In this case, the exposed glass 40 is subsequently recoated with an UV curable fluoroacrylate recoat layer 42. This can be done using a fiber recoater such as the Vytran PTR-200. At the location where the recoat layer is in direct contact with water, a sealant cap 44 is added in order to significantly impede the penetration of water into the outer cladding and the recoat layer. Also, the sealant cap is heat resistant, in the sense that its optical and mechanical parameters do not significantly degrade for temperatures up to 85° C. The sealant cap is also chemically stable when exposed to water in a temperature ranging from −40° C. to 85° C. The following materials are examples which can be used for the sealant cap: an acrylate such as as DSM DS-2015, 3471-2-136 or SSCP CO. UVF-HTS-001, silicone (such as Nusil Lightspan LS-3), fluorinated ethylenic-cyclo oxyaliphatic substituted ethylenic copolymer (such as Teflon AF available from Dupont), an optical epoxy with a low refractive index (such as ÅngströmBond EX1128), etc. This sealant material will be applied once the recoat layer is cured, the recoat layer is subsequently placed in a mold that can be filled with the sealant material. In some cases, placing the sealant material in an oven or using with an infrared (IR) source can accelerate curing. The ICure IR source from IRPhotonics is an example. Alternately, some materials can be cured with a UV light source, such as the Dymax 5000-EC curing system for instance.

Figure 7:
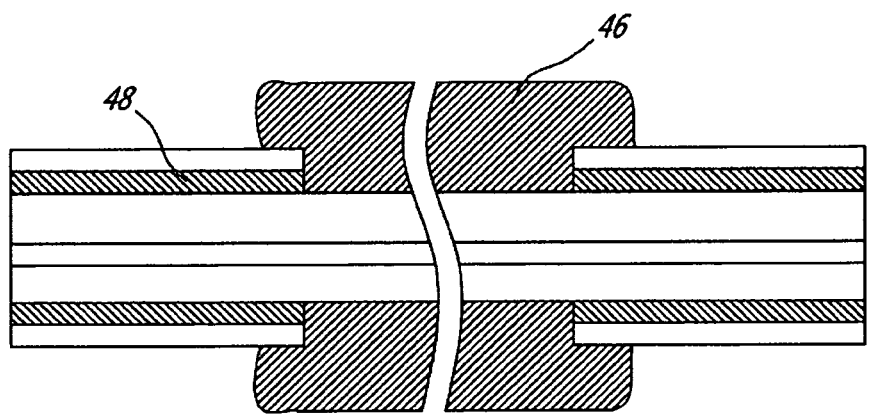
FIG. 7 shows a second example of an optical fiber with a sealant, where the sealant is applied directly onto the bare stripped portion.

FIG. 7 shows another exemplary embodiment where the portion is not recoated with a fluoroacrylate material, but rather with a more stable sealant cap 46 of a material such as a low index optical epoxy, silicone or fluorinated ethylenic-cyclo oxyaliphatic substituted ethylenic copolymer, for instance. This can be done in a manner similar to that which is described above. In this case, the refractive index of the sealant cap should be equal to or inferior to the refractive index of the outer cladding 48 and should be transparent to the light propagating in the inner cladding 14 and the core 10.

Figure 8:
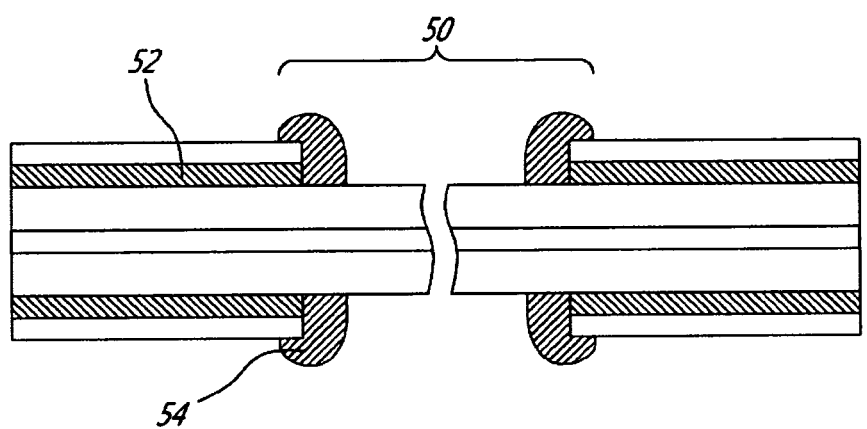
FIG. 8 shows a third example of an applied sealant, where the sealant is applied directly on exposed faces of the outer cladding.

FIG. 8 shows still another exemplary embodiment where the stripped region 50 is left uncoated. In such a case the outer cladding can be sealed using a sealant cap 54 made of a sealant material such as a low index epoxy with proper environmental properties, while ensuring that the splice joint or window is left exposed. A drop of the sealant material can be applied to the exposed outer cladding layer with a syringe. In this case, the refractive index of the sealant material should be equal to or inferior to the refractive index of the outer cladding 52 and should be transparent to the light propagating in the inner cladding 14 and the core 10.

In all embodiments, the sealed fiber can then be placed in an enclosure for mechanical, thermal and environmental protection.

Figure 9:
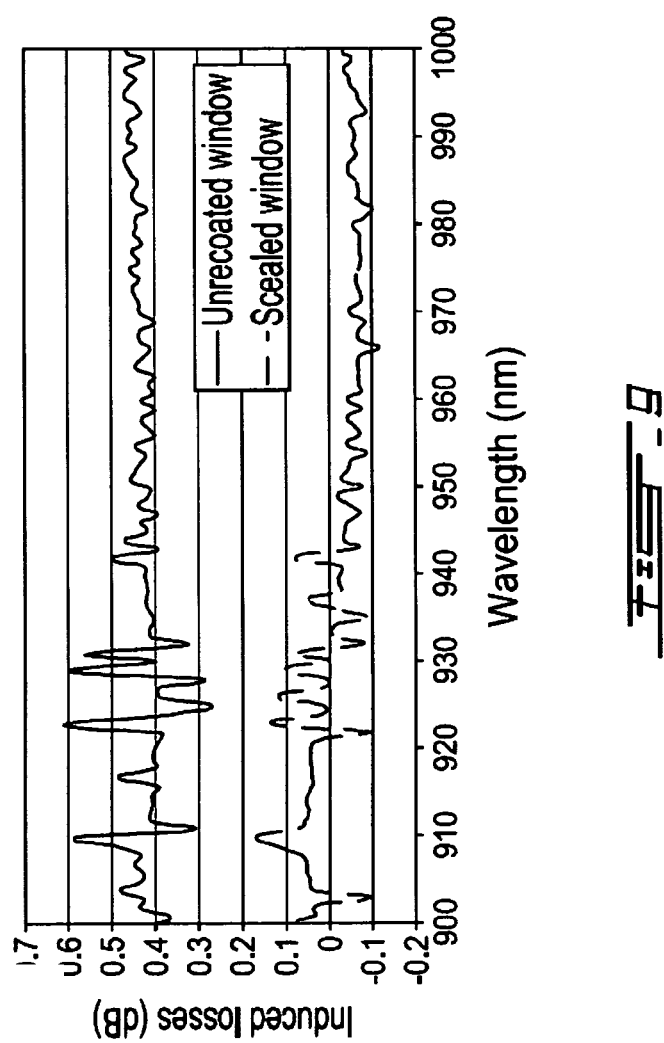
FIG. 9 is a graph showing results of tests done with the stripped portion left bare, and with a sealant applied.

FIG. 9 shows test results taken with a 125 micron standard fluoroacrylate fiber which was stripped on 5 cm. A first such fiber was left completely unrecoated. A second such fiber was recoated with fluoroacrylate, and a sealant cap layer of the same type of acrylate than the jacket of the fiber was applied. Both fibers were placed in an experimental room at 85% relative humidity and 85° C. for 300 hours. The results show an attenuation of the order of 0.4 dB for the unrecoated fiber, whereas the sealed fiber shows no significant attenuation.

The embodiments described above are intended to be exemplary only. The scope of the invention is therefore intended to be limited solely by the appended claims.

I claim:

1. A double clad optical fiber having a waveguide core, an inner waveguide cladding around the core having an inner cladding refractive index, and an outer waveguide cladding around the inner cladding having an outer cladding refractive index lower than the inner cladding refractive index, and a jacket around the outer waveguide cladding having a jacket refractive index, the optical fiber having a portion extending along its length along which the outer waveguide cladding and the jacket are absent, the portion having corresponding faces of the outer waveguide cladding at two lengthwisely opposite ends of the portion, and having a sealant extending along the entire length of the portion, the sealant impeding lengthwise diffusion of environmental water through both faces, into the outer waveguide cladding.

2. The double clad optical fiber of claim 1 wherein the outer waveguide cladding is a fluoroacrylate cladding.

3. The double clad optical fiber of claim 1 wherein the sealant is applied directly onto and entirely covers the two faces of the outer waveguide cladding, entirely covers the inner waveguide cladding, and has a refractive index at least as low as the outer cladding refractive index.

4. The double clad optical fiber of claim 2 wherein a fluoroacrylate recoating is applied directly onto and entirely covers each of the two faces of the outer waveguide cladding and the inner waveguide cladding along the entire length of the portion, and the sealant is applied directly onto and entirely covers the fluoroacrylate recoating.

5. The double clad optical fiber of claim 4, wherein the sealant is of the same material as the jacket.

6. The double clad optical fiber of claim 1 wherein the sealant is one of a PTFE, a silicone, an acrylate, and an epoxy.

7. A method of protecting a double clad optical fiber having a waveguide core, an inner waveguide cladding around the core, and an outer waveguide cladding around the inner cladding made of a fluoroacrylate, and a jacket around the outer waveguide cladding, the optical fiber having a portion extending along its length along which the outer waveguide cladding and the protective jacket are absent, the portion having corresponding faces of the outer waveguide cladding at two lengthwisely opposite ends, the method comprising:
applying a sealant along the entire length of the portion in a manner to prevent water from affecting the faces of the outer waveguide cladding.

8. The method of claim 7 wherein said step of applying includes applying the sealant directly onto and in a manner to entirely cover the two faces of the outer waveguide cladding.

9. The method of claim 8 wherein the step of applying further includes applying the sealant directly onto and in a manner to entirely cover the inner cladding along the entire length of the portion.

10. The method of claim 7 further comprising recoating with a recoat fluoroacrylate material directly onto and in a manner to entirely cover each of the two faces of the outer waveguide cladding and the inner cladding along the entire length of the portion, wherein said step of applying includes applying the sealant directly onto and in a manner to entirely cover the recoat fluoroacrylate material.

11. An environmentally robust optic fiber package for an exposed optical fiber, said exposed optical fiber having a core region having a core refractive index, said core region being made of doped silica; an inner cladding region, said inner cladding region being made of one of silica or doped silica, an outer cladding region layer having an outer cladding refractive index, said outer cladding region layer being made of a low refractive index non silica material, and a protective jacket layer;
said outer cladding region layer having an exposed portion for which said protective jacket layer is absent, said exposed portion permitting access to said outer cladding region layer by a contaminant;
said package comprising:
a cap covering at least said exposed portion by a sealing layer having a sealant refractive index, said sealant refractive index being one of lower than and equal to said outer cladding refractive index, said sealing layer having barrier properties preventing said contaminant to reach said cladding region layer.

12. The package of claim 11, wherein said contaminant is water.

13. The package of claim 11, wherein said exposed portion is an end face of said outer cladding region layer at an edge of a stripped window portion of said optical fiber, whereby a stripped length of said outer cladding region layer and said protective jacket layer are removed to expose said inner cladding region.

14. The package of claim 11, wherein said exposed portion is a surface portion of said outer cladding region layer where said protective jacket layer is removed.

15. The package of claim 11, wherein said sealant is a low index epoxy with water barrier properties.

16. The package of claim 11, wherein said sealant is made of silicone.

17. The package of claim 11, wherein said sealant is made of fluorinated ethylenic-cyclo oxyaliphatic substituted ethylenic copolymer.

18. The package of claim 11, wherein said cap is adapted to be provided over a cladding region layer recoat covering at least said exposed portion.

19. The package of 11, wherein said core region and said inner cladding region are provided in a single doped silica region.

20. A double clad optical fiber having a waveguide core, an inner waveguide cladding around the core having an inner cladding refractive index, and an outer waveguide cladding around the inner cladding having an outer cladding refractive index lower than the inner cladding refractive index, and a jacket around the outer waveguide cladding having a jacket refractive index, the optical fiber having a portion extending along its length along which the outer waveguide cladding and the jacket are absent, the portion having corresponding faces of the outer waveguide cladding at two lengthwisely opposite ends of the portion, and having a sealant applied directly onto and entirely covering the two faces of the outer waveguide cladding, the sealant impeding lengthwise diffusion of environmental water through both faces, into the outer waveguide cladding.

21. The double clad optical fiber of claim 20 wherein the inner cladding is left exposed between the sealant covering the two faces.

22. The double clad optical fiber of claim 1 wherein a recoating is applied directly onto and entirely covers each of the two faces of the outer waveguide cladding and the inner waveguide cladding along the entire length of the portion, and the sealant is applied directly onto and entirely covers the recoating.

* * * * *